United States Patent
Dent et al.

(10) Patent No.: US 6,430,391 B1
(45) Date of Patent: Aug. 6, 2002

(54) DUPLEX SATELLITE COMMUNICATION USING A SINGLE FREQUENCY OR PAIR

(75) Inventors: Paul W. Dent, Pittsboro; Tony Ottoson, Morrisville, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/451,210

(22) Filed: Nov. 29, 1999

(51) Int. Cl.[7] .................................................. H04Q 7/20
(52) U.S. Cl. ....................... 455/11.1; 370/315; 370/529; 455/13.1
(58) Field of Search .................. 455/11.1, 443, 455/445, 446, 447, 450, 451, 452, 455, 464, 7.427, 8, 9, 10, 13.1, 12.1, 16, 504, 511, 517, 61, 118, 131, 207; 370/315, 276, 277, 279, 280, 281, 316, 319, 328, 329, 330, 344, 437, 529

(56) References Cited

U.S. PATENT DOCUMENTS

| | | | |
|---|---|---|---|
| 4,554,677 A | * 11/1985 | Smith et al. ................ 455/512 |
| 5,089,917 A | * 2/1992 | Kanota et al. ................ 360/45 |
| 5,091,918 A | 2/1992 | Wales | |
| 5,151,919 A | * 9/1992 | Dent .......................... 370/209 |
| 5,237,586 A | * 8/1993 | Bottomley ................... 370/206 |
| 5,528,665 A | * 6/1996 | Peitz .......................... 455/403 |
| 5,537,443 A | 7/1996 | Yoshino et al. | |
| 5,583,886 A | 12/1996 | Rohani et al. | |
| 5,640,432 A | 6/1997 | Wales | |
| 5,712,637 A | * 1/1998 | Lindquist et al. .......... 341/155 |
| 6,119,018 A | * 9/2000 | Kondo ........................ 455/522 |

* cited by examiner

Primary Examiner—Nay Maung
Assistant Examiner—Jean A Gelin
(74) Attorney, Agent, or Firm—Coats & Bennett, P.L.L.C.

(57) ABSTRACT

An improved satellite communications system allows for greater spectral efficiency by requiring just two frequencies for wireless communications between a first ground-based station and a second ground-based station via a satellite. Both the first station and the second station use the first frequency to transmit signals to the satellite; the satellite transponds the signals it receives on the first frequency to the second frequency and transmits the signals to the first and second stations on the second frequency. Use of two frequencies in such a manner results in some own-signal interference. The first station preferably stores its outgoing signals in memory and then subtracts out these stored signals to eliminate the its own-signal interference. The second station may likewise store and subtract out its transmissions, but this is not required. The present invention also contemplates that each satellite beam cell will have its own network station, thereby allowing for simpler antenna configurations to be used.

39 Claims, 6 Drawing Sheets

DUPLEX SATELLITE COMMUNICATION USING A SINGLE FREQUENCY OR PAIR

The invention relates to satellite communications systems for relaying signals between a first ground-based station and a second ground-based station.

BACKGROUND

In most prior art satellite communications systems, a network station transmits signals to a satellite in a first frequency band called the feeder uplink. After receiving feeder uplink signals, the satellite converts them to a second frequency band and transmits them to the mobile phones. The mobile phones reply on a third frequency band which is received at the satellite and translated to a fourth frequency band called the feeder downlink for transmission to the network station. Thus, in the prior art, four distinct frequency bands were required for a satellite communications system.

In the IRIDIUM system, the aforementioned second and third frequency bands are the same. An IRIDIUM satellite receives signals from a network station in the first frequency band and translates them to be relayed using a timeslot on a carrier frequency in a second frequency band. An IRIDIUM mobile phone receives the signal relayed by the satellite in the allocated timeslot on the allocated carrier frequency in the second frequency band. After a guard time to allow satellite transmissions that are reflected from the earth to propagate beyond the satellite orbit, the IRIDIUM phone replies in a second timeslot on the same second frequency band. The IRIDIUM satellite receives and translates the reply to the fourth frequency band and relays it to a network station. Thus, the IRIDIUM system uses three frequency bands for a given network station to communicate with a given mobile phone. The first and fourth frequency bands in the IRIDIUM system can include optical frequencies for conveying signals from satellite to satellite but ultimately radio frequency feederlinks are used for communication between the orbiting satellites and a network station. In the IRIDIUM system, the network stations do not transmit signals overlapping mobile phone transmissions in the same frequency band in the same cell or beam.

The prior art of landmobile radio systems includes the technique known as "two-frequency simplex". In two-frequency simplex, a first mobile station desirous of communicating with a second mobile station transmits on a frequency f1 to a base station repeater. The base or repeater station usually comprises an elevated, typically directional, antenna that can receive the weak mobile station's signal, which the second mobile at ground level cannot receive directly. The repeater station then translates the received signal from f1 to f2 and retransmits it at f2 to the second mobile station. When the second mobile station wishes to reply, it transmits on f1 to the repeater, but not at the same time as the first mobile station. If this happens, it is known as "doubling" and the signal became garbled in the prior art.

In trunked landmobile radio systems, a station desirous of transmitting transmitted first an "access request" burst to the repeater using a third frequency f3 or calling channel, and the repeater replied on a channel f4 with an "access grant" message indicating the channel f1 to be used for transmitting the rest of the communication, only if another station in the same group or net was not already transmitting. Accidental "doubling" could thus be prevented in the prior art of trunked landmobile radio systems. These systems operated on a "push-totalk" basis, which is a simplex and not a duplex communications method. By using voice-operated switching or "VOX" instead of hand-operated transmit switches, the appearance of engaging in a duplex or telephone type of conversation can be provided, but VOX is not a perfect technique and occasionally fails to adapt fast enough to change of the speech direction. It imposes a discipline on the speakers to wait until the other person has completely finished talking before replying, which is not present in natural or telephone conversations.

An early military communications system called the Defense Satellite Communications System, or DSCS for short, comprised only two frequency bands for respectively transmitting to the satellite and receiving signals relayed from the satellite. The satellite merely performed a frequency translation and amplification of the received signals prior to retransmission. This type of satellite is known as a "bent pipe" transponder. These satellites had single, whole-earth coverage antenna beams. More powerful versions of DSCS type satellites known as SKYNET satellites were built and launched by Philco-Ford (now LORAL corporation) and GEC-Marconi for the British Defense Department.

In the prior art DCSC and SKYNET systems, a first station desirous of communicating with a second station transmitted a spread-spectrum signal to the satellite in a first frequency band. The second station also replied to the first station by transmitting a signal to the satellite in the first frequency band which was received overlapping the first station's signal at the satellite. The bent-pipe satellite translated the sum of the received first and second stations' signals to the second frequency band and relayed them to the first and second station. The first station despread the received signal using the second station's spread-spectrum transmission code thereby suppressing interference from other signals, including its own, to an extent limited by the spread-spectrum processing gain. The second station likewise decoded the first station's signal by despreading the received signal using the first station's spread-spectrum transmission code, thereby suppressing other interfering signals, including its own, to an extent limited by the spread-spectrum processing gain. Indeed, spread-spectrum was used in this prior art for the purpose of discriminating the desired signal from interference including own signal. Spread spectrum was also used however to obtain resistance to enemy jamming. In this prior art, no attempt was made to remove own signal interference by storing own signal in a delay memory for subtraction from the signal received later from the satellite. There was moreover no motivation to do so as own signal interference was only a small fraction of the total interference, which could include enemy jamming.

By contrast with the DSCS and SKYNET prior art, the present invention is directed to a civil communications system which does not contemplate hostile jamming. There is therefore no motivation automatically to select spread spectrum techniques. However, the use of spread-spectrum signals is one implementation of the current invention and differs from the above prior art in the subtraction of own interference at a network station so as better to decode weaker, portable-station signals transponded by the satellite.

In U.S. Pat. Nos. 5,151,919 and 5,218,619 to Applicant, methods are disclosed in CDMA systems to subtract stronger interfering signals before demodulating weaker signals. However, in the applications disclosed all signals comprised largely unknown symbols that had to be decoded first prior to subtraction. This was because the interfering signals did not originate at the same station as the receiving station, as is the case for the invention described below. The above patents incorporated herein by reference and certain of the mathematical techniques disclosed therein can be incorporated into the current invention for subtracting known signals by nulling in a transform domain, when using signals of the type contemplated therein.

SUMMARY

A satellite communications system includes at least one orbiting satellite having an antenna, or antennas, for transmitting signals in a first frequency band and receiving signals in a second frequency band. The antenna or antennas may furthermore be multi-beam antennas with each of the multiple beams covering a particular service region or cell. The present system furthermore comprises, in each cell, a first ground-based station for communicating with one or more second ground-based stations in the same cell. The first ground-based station can for example be a network station connected to the public switched telephone network (PSTN) or the Internet, and the second ground-based station may be a portable wireless telephone. Alternatively, the first station may also be a wireless telephone desirous of communicating with a second, similar, wireless telephone.

According to the present invention, the first station and the second station transmit to each other simultaneously using a first frequency band which signals are received overlapping at the satellite. The received, overlapping signals are translated to a second frequency band and then transmitted by the satellite to both the first and the second station. The first station thus receives from the satellite the signal from the second station overlapped with the signal it transmitted itself T milliseconds earlier, where T is the round-trip propagation delay. The first station remembers in an electronic memory the signal it transmitted T milliseconds earlier and subtracts the remembered signal from the received signal to reveal the second station's signal, which it then decodes without interference from its own signal. The second station may do likewise to decode signals transmitted by the first station and relayed by the satellite.

According to another aspect of the invention, one of the stations may be designated as a master station (e.g., the network station) and provide the standard for frequency and timing. The second station is designated as a slave station (e.g., the mobile satellite phone) and determines a relative delay between the first station's signal relayed by the satellite and its own signal relayed by the satellite. The second station then adjusts its transmit timing such that its own signal has a desired time-alignment with the first station's signal as relayed by the satellite. Adjusting transmit timing can for example mean advancing or retarding transmission of a TDMA burst. Determining a relative timing can, for example, be done by correlating the received signal both with its own signal and with a known symbol pattern or syncword embedded in the first station's transmission. The first or second station may subtract its own signal by using the correlation between the received signal and its previously transmitted and memorized signal to properly scale the memorized signal prior to subtraction. Correlation, scaling, and subtraction may moreover be applied with different time-alignments between the received signal and the memorized signal so as to compensate for intersymbol interference or multi-path propagation effects.

In a second implementation of the invention, a single frequency band only may be employed. The first and second stations transmit a TDMA burst to the satellite timed to arrive simultaneously at the satellite as previously described. The satellite receives the signals and stores them in a delay line or memory and then replays the signals out of the memory and retransmits them in a different TDMA timeslot during which it is not receiving signals from the ground stations. The ground stations receive the retransmitted signals and decode them after subtracting their own signal content as before.

According to yet another aspect of the invention, a first station (e.g., the network station) is equipped with a much larger antenna than the second station (e.g., the portable station) and is thus able to receive signals from the satellite largely uncorrupted by radio noise. It also transmits signals using its larger antenna that are received at the satellite much more strongly than the second station's signal and thus the signal relayed by the satellite contains a much greater proportion of the first station's signal than the second station's signal. The second station may not therefore need to subtract its now much smaller, own-signal content in order to decode the first station's signal, however the second station may do so nonetheless. The first station receives a signal from the satellite containing a much lower second station signal, and thus must subtract its own, dominant signal to reveal the weaker, underlying second station signal, which it can decode nonetheless thanks to its larger antenna having reduced the significance of thermal noise. Successful communications in both directions are guaranteed by maintaining a satisfactory uplink signal-to-noise ratio for the weaker, second station's signal as received at the satellite, and by guaranteeing a satisfactory downlink signal-to-noise ratio for the stronger first station's signal as received at the second station after being relayed by the satellite, with the quality of the uplink from the first station and the downlink to the first station being guaranteed by its much larger antenna. The second implementation of the invention using Time Division Duplex and a single frequency band may also be used with first and second stations having different antenna sizes.

According to a further aspect of the invention, the satellite effects cross-coupling of signals between beams under control of one or more control stations. A signal received in a first timeslot on a first frequency in a first beam comprises overlapping signals from a first and second station in the first beam. The composite overlapping signal is translated to a second frequency and transmitted in a second beam to a third station. The third station decodes the stronger of the first and second stations' signals, subtracts it from the composite signal, and then decodes the weaker underlying signal. Alternatively, the third station jointly demodulates the overlapping first and second stations' signals and couples a selected signal or both to the PSTN. The third station also transmits a signal to the satellite using said first frequency again in said second beam. Alternatively, another channel in the same band as the first frequency may be used. The third station's signal is received at the satellite and may be overlapped by a signal transmitted on the same frequency and timeslot by a fourth station in the second beam. The satellite translates the third and fourth stations' overlapped signals from the first frequency band to the second frequency band and transmits them in the first beam. The first and/or second station receives the relayed signals in the first beam and decodes the stronger of the third or fourth stations' signals. The third or fourth station may proceed to subtract the decoded, stronger signal and then decode the weaker of the third or fourth stations' signals, or else the third or fourth station may jointly demodulate both signals. The third or fourth station may then couple either or both of the decoded signals to the PSTN, or alternatively terminate the signal in its own telephone earpiece.

The invention to be described may utilize VOX or "discontinuous transmission" (DTX) for the purposes of saving battery power in a mobile station or saving satellite power; however, DTX is not relied upon as a means to reverse the direction of traffic flow, which can be full duplex. Full duplex traffic flow is maintained when practicing the invention even during the aforementioned "doubling", and full duplex traffic flow can be even more useful in non-voice modes such as packet data modes for exchanging computer data.

DESCRIPTION

The present invention allows for greater efficiency by requiring just two frequencies for wireless communications between a first ground-based station and a second ground-based station via a satellite. Both the first station and the second station use the first frequency to transmit signals to the satellite; the satellite transponds the signals it receives on the first frequency to the second frequency and transmits the signals to the first and second stations on the second frequency. Use of two frequencies in such a manner results in some own-signal interference. In a preferred embodiment, the first station stores its outgoing signals in memory and then subtracts these stored signals from the received signal to eliminate own-signal interference. The second station may likewise store and subtract its transmissions from the received signal, but this is not required. The present invention also contemplates that each satellite beam cell will have its own network station, thereby allowing for simpler antenna configurations to be used.

Figure 1:
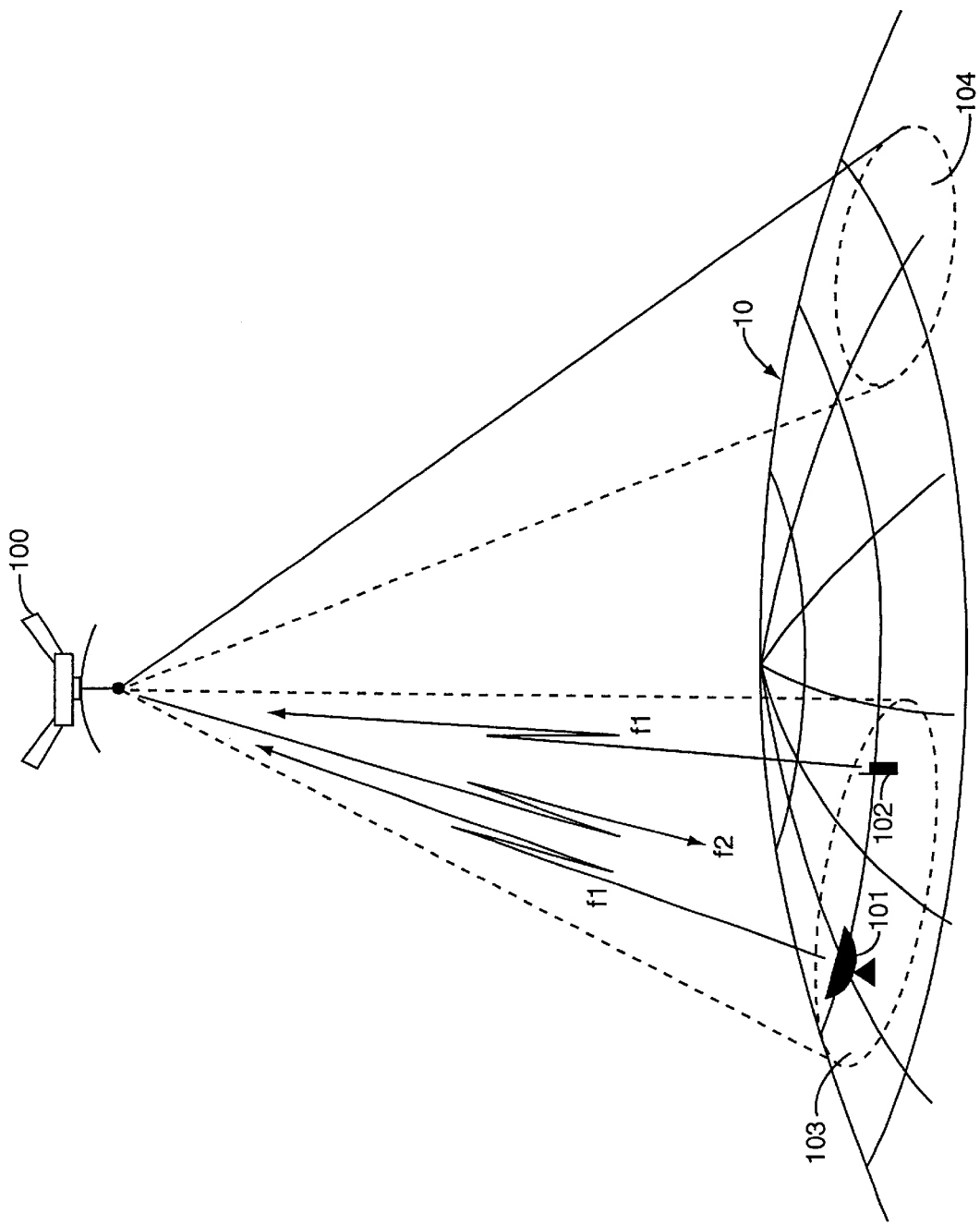
FIG. 1 shows a satellite communications system according to the present invention.
Figure 2:
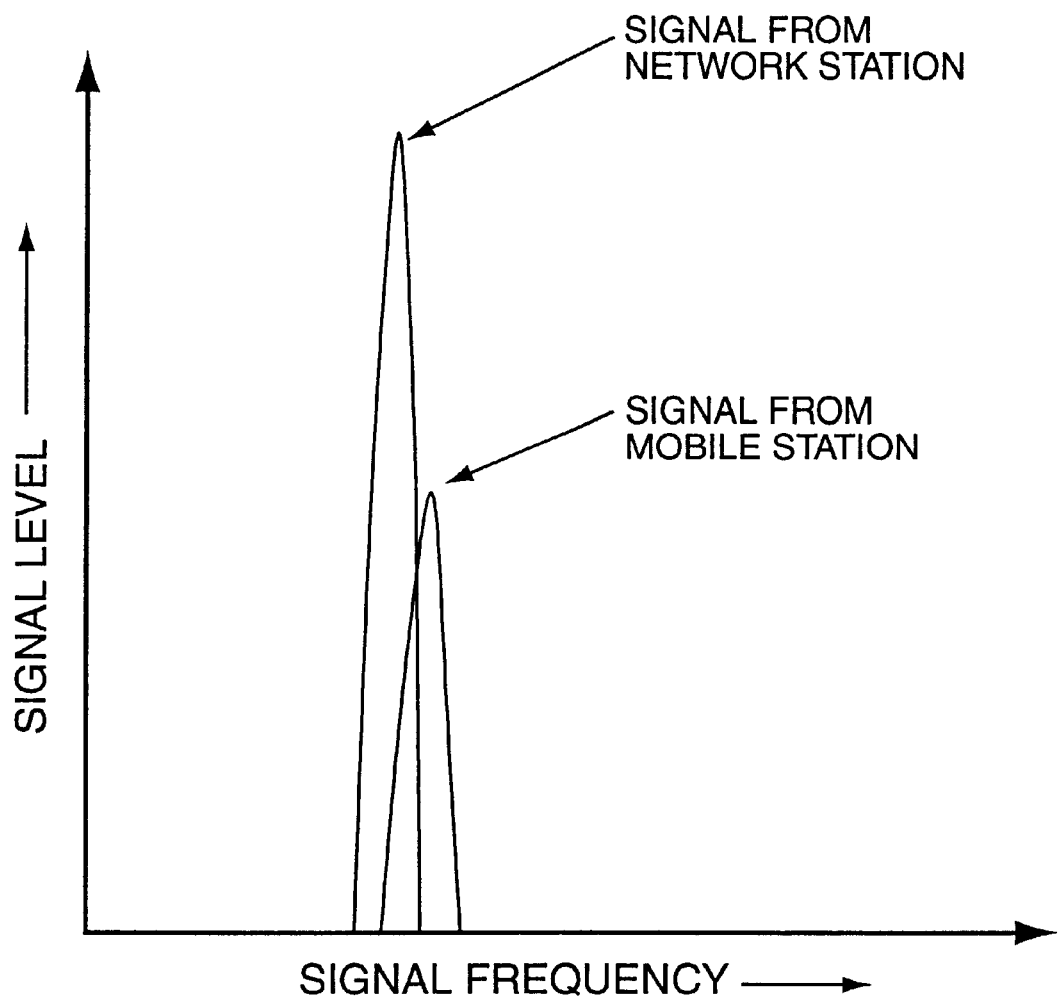
FIG. 2 shows the relative signal levels received at the satellite from the network station and the mobile station on frequency f1.

A satellite communications system according to the invention is illustrated in FIG. 1. A satellite 100 having a directional antenna receives signals from an area 103 on the earth (10) using frequency band f1 and transmits signal to region 103 using frequency band f2. Satellite 100 preferably comprises a multi-beam antenna for transmitting to and receiving from other regions (104) also using the same frequencies in a different location, thereby achieving frequency re-use. A network station 101 transmits signals destined for a mobile or portable station 102 to the satellite on a first frequency f1. The network station 101 may be connected to the Public Switched Telephone System (PSTN) and the transmitted signal may have originated from a fixed network telephone subscriber. The mobile station 102 transmits a reply to the satellite also using frequency f1. The signals from network station 101 and mobile station 102, both on frequency f1, are received overlapping or at least partially overlapping, if the frequencies are not identical but not separated by more than the signal bandwidth. The signals may also be received at different levels at the satellite as illustrated in FIG. 2. Satellite 100 merely frequency-translates the received signals from f1 to f2 and retransmits (transponds) the signals on f2 to region 103 where the composite signal is received both by network station 101 and mobile station 102.

In this example, the network station 101 is in the same beam 103 as the mobile station 102. A perfectly useful mobile communications system can be constructed with this limitation, namely that a network station 101 connected to the PSTN must be located in the same beam as the mobile stations 102 to which it provides service. Due to the large diameter of satellite beams, typically at least 200 kM, the number of network stations 101 needed to cover, for example, the U.S.A. is still of the order of 1/100th of the number of land-based cellular stations required for the same coverage.

Moreover, when using the invention, such network stations 101 are orders of magnitude simpler and cheaper than the network stations of a prior art satellite system, which may use antennas of 30-foot diameter. The antennas of the network stations 101 when practicing the invention need only have an antenna gain somewhat higher than that of a mobile station 102, by for example 10 to 20 dB, which can be achieved using a small Yagi or endfire helical antenna. The mobile stations 102 may have short stub or quarter wave antennas as is customary on contemporary cellular phones, the radiation patterns being as far as possible omnidirectional with zero dBI directivity.

Figure 3:
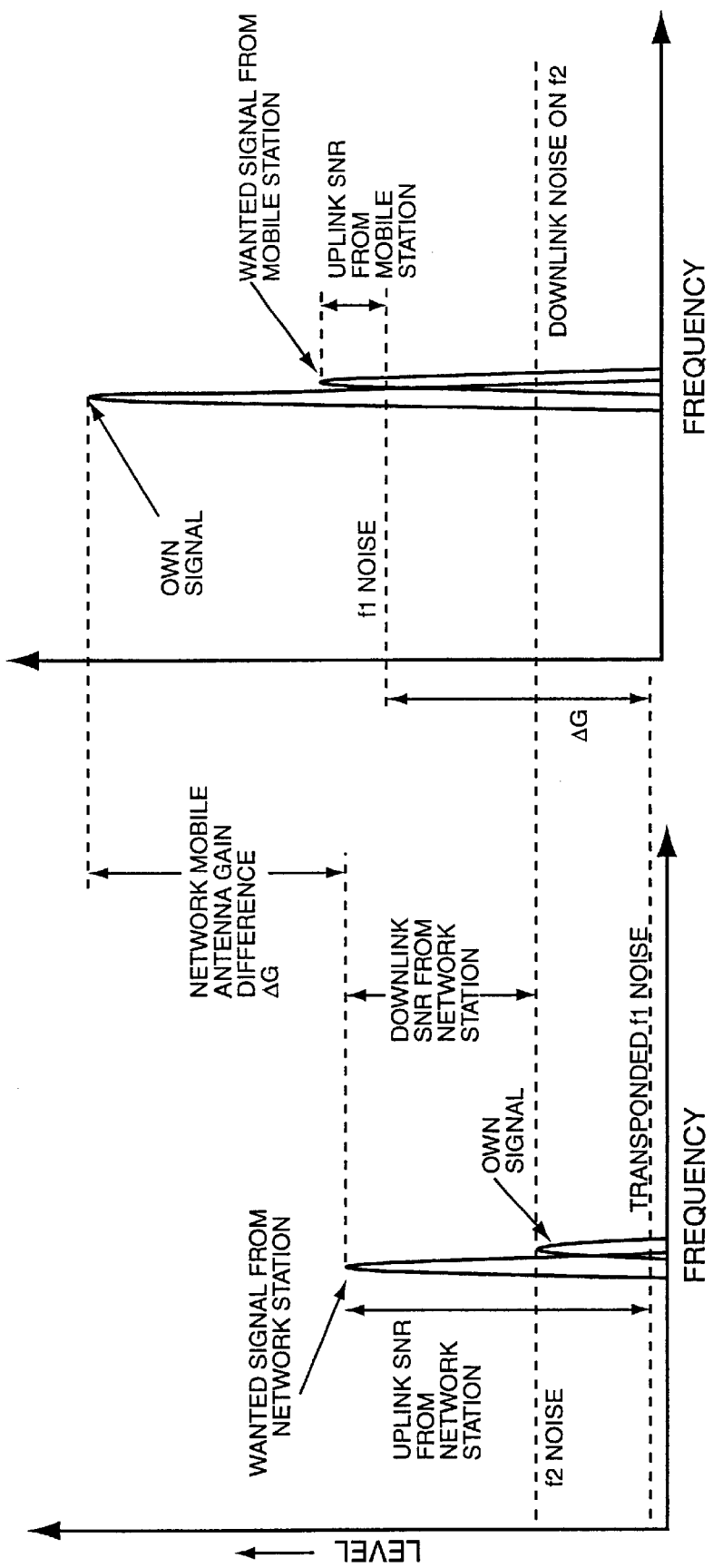
FIG. 3 shows the relative signals and noise levels received at the mobile station on frequency f2 (3A) and at the network station (3B).

FIG. 3 illustrates the signal levels relative to noise received from the satellite on frequency f2 at network station 101 and mobile station 102 respectively. In the left half of FIG. 3 (labeled 3A), signals received at the mobile station 102 are shown. The largest signal is the wanted signal from the network station 101 which the mobile station 102 shall decode. The satellite transmission power on f2 is chosen to be adequate for providing mobile station 102 with an adequate signal to noise ratio between the transponded network signal received at the mobile station 102 and the downlink noise on f2 received at the mobile station 102, labeled "downlink SNR from 101". Other interfering signals apart from f2 noise are the mobile station's own signal transponded by the satellite 100, which however is much weaker than the transponded network station's signal, and uplink noise on f1 which is transponded to f2 by the satellite 100. The satellite transponder gain is chosen so that transponded uplink noise is preferably weaker than f2 noise received at the mobile station 102, so that the satellite-to-mobile direction of communication is dominated by downlink noise. If the ratio between the wanted network signal and the mobile's own signal is sufficient, the mobile station 102 may successfully decode the network signal without regard to its own interference. For example, if the signals are digital transmissions using rate-1/2 convolutional coding, which can be successfully decoded at or below 6 dB $E_b/N_o$ even in a fading environment, where $E_b$ is the energy per information bit and $N_o$ is the noise+interference spectral density, this corresponds to an $E_c/N_o$ of 3 dB where $E_c$ is the transmitted symbol energy. An $E_c/N_o$ of 3 dB corresponds to a C/I (Carrier to Interference ratio) of 3 dB for BPSK modulation or 6 dB for QPSK modulation. To render self-interference negligible compared to noise, self interference should be 6 to 10 dB below this, i.e., at a 12 to 16 dB C/I level. Thus, the ratio of the wanted network signal to the unwanted self interfering mobile signal should be in the range 12–16 dB. At 12 dB, a 1 dB reduction in signal-to-noise+interference ratio is incurred if the mobile station 102 does not cancel its own interference; this falls to 0.5 dB at 16 dB signal ratio. Thus it is possible to implement a system in which only a small penalty is incurred if the mobile stations 102 do not attempt to subtract own interference, if this would result in an unacceptable cost increase in mobile stations 102.

In the right half of FIG. 3 (labeled 3B), signal levels received at the network station 101 are shown. The signals transponded by the satellite 100 comprising the network station's own signal, the wanted mobile signal and transponded f1 noise are now all received considerably stronger than at the mobile station 102 due to the network station's antenna having a higher gain by the amount dG compared to the mobile station 102. The largest signal is still the network station's signal, which however is now an interfering signal as the network station 101 wishes to decode the weaker mobile station's signal. Therefore, the network station 101 must implement means to discriminate the weaker mobile signal from its own signal. The interfering signal is the signal which the network station 101 transmitted T milliseconds ago, where T is the round trip delay from the network station 101 to the satellite 100 and back again. It is a simple matter for the network station 101 to save the signal it transmitted in a memory for use T milliseconds later to subtract from the received signal, thereby suppressing own interference to reveal the weaker underlying mobile station's signal it wishes to decode. Details of various practical own-interference suppression techniques are discussed below.

The mobile 102 or network station 101 would most likely employ a quadrature modulator to impress information on the transmitted carrier frequency f1. A quadrature modulator receives an In-phase modulating signal (I) for modulating the cosine-wave or "real" component of the f1 carrier and a Quadrature (Q) for modulating the sine or "imaginary" part of the f1 carrier. Quadrature modulators and improvements thereto are disclosed more fully in U.S. Pat. Nos. 5,867,537; 5,745,523; 5,629,655; and 5,530,722, which are incorporated herein by reference.

The above '523 patent also discloses that an analog Frequency Modulation (FM) can be produced with such a modulator as well as a digital modulation, or indeed any modulation whatsoever, by suitably generating the I and Q signals. The I and Q signals applied to the transmitter's quadrature modulator thus represent exactly what was transmitted and can be stored in digital form at a suitable number of samples per second in a memory. The number of samples per second to represent the entire, rounded shape of the premodulation-filtered transmitter waveform may be of the order of eight times the transmitted digital symbol rate. For example, for a transmitted symbol rate of 13 MHz/48, which is the symbol rate of the popular GSM cellular standard, the stored sample rate might be 13 MHz/6 for I and Q signals. The round trip delay T for a geostationary satellite is around 270 milliseconds, therefore the memory size would be approximately 0.27×13 MHz/6=600 kbytes for each of I and Q. A memory of a few megabytes, which might for example be dynamic RAM, is a single chip costing a few dollars in today's technology. Nevertheless, there are alternatives to storing I and Q waveforms at eight samples per symbol that reduce the memory size and achieve sufficient interference subtraction.

The I,Q representation of the signal received from the satellite 100 at f2 may differ from that transmitted by the network station 101 at f1 if the satellite transponder restricts the bandwidth to a value similar to the signal bandwidth, for example. A likely form of satellite transponder would not however restrict the bandwidth to such a low value, but would be designed to handle multiple conversations on different channels in the frequency bands f1 and f2, and would have a single bandwidth in each beam covering multiple channels. Nevertheless, it is advantageous to utilize a signal subtraction method which is immune to possible waveform modification in the round-trip path.

A preferred modulation method employs digital speech or traffic encoding, error correction coding, and a linear modulation method which applies encoded data bits as impulses to excite a premodulation I,Q filter. The impulse response of the transmit filter is chosen to provide a rounded pulse corresponding to each bit or symbol that restricts the transmitted spectrum to an allocated channel bandwidth. A typical premodulation filter would have a root-raised-cosine frequency response where the raised-cosine response (before taking the square root of it) is Nyquist for the given transmitted symbol rate. A Nyquist response ensures that, at the optimum sampling instants for each symbol, there is no intersymbol interference (ISI) from neighboring symbols. If the receiver filter is also a root-raised-cosine or root-Nyquist filter, then the product of the transmit root-Nyquist filter and the receive root-Nyquist filter is a Nyquist filter with the desired no-ISI property. The whole transmission loop from transmitter modulator input to receiver output therefore comprises the transmit filtering, the transponder filtering (if significant), the receiver filtering, and multi-path propagation distortion (if significant).

Figure 4:
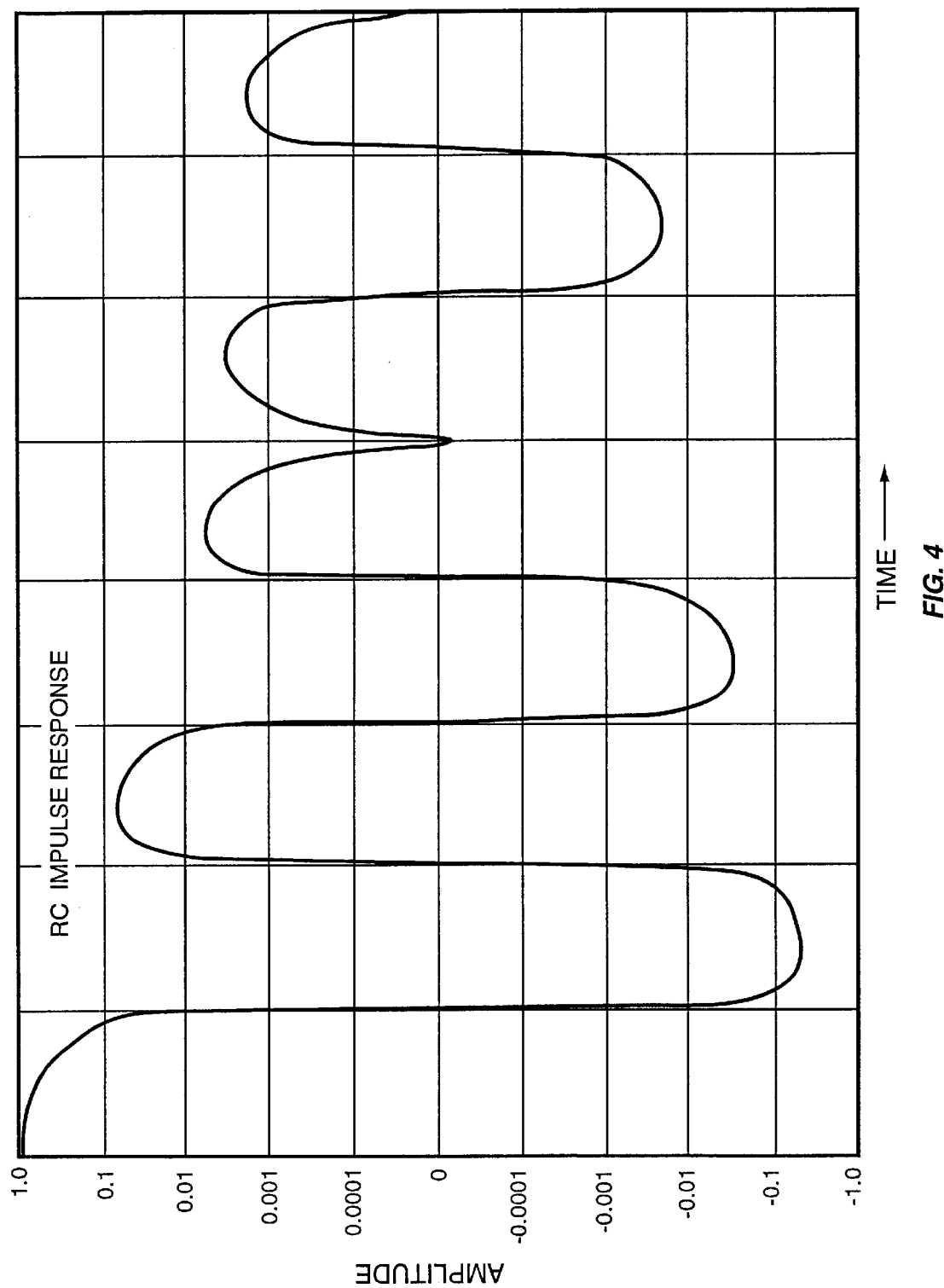
FIG. 4 shows an impulse response for a raised cosine Nyquist filter on a log scale.
Figure 5:
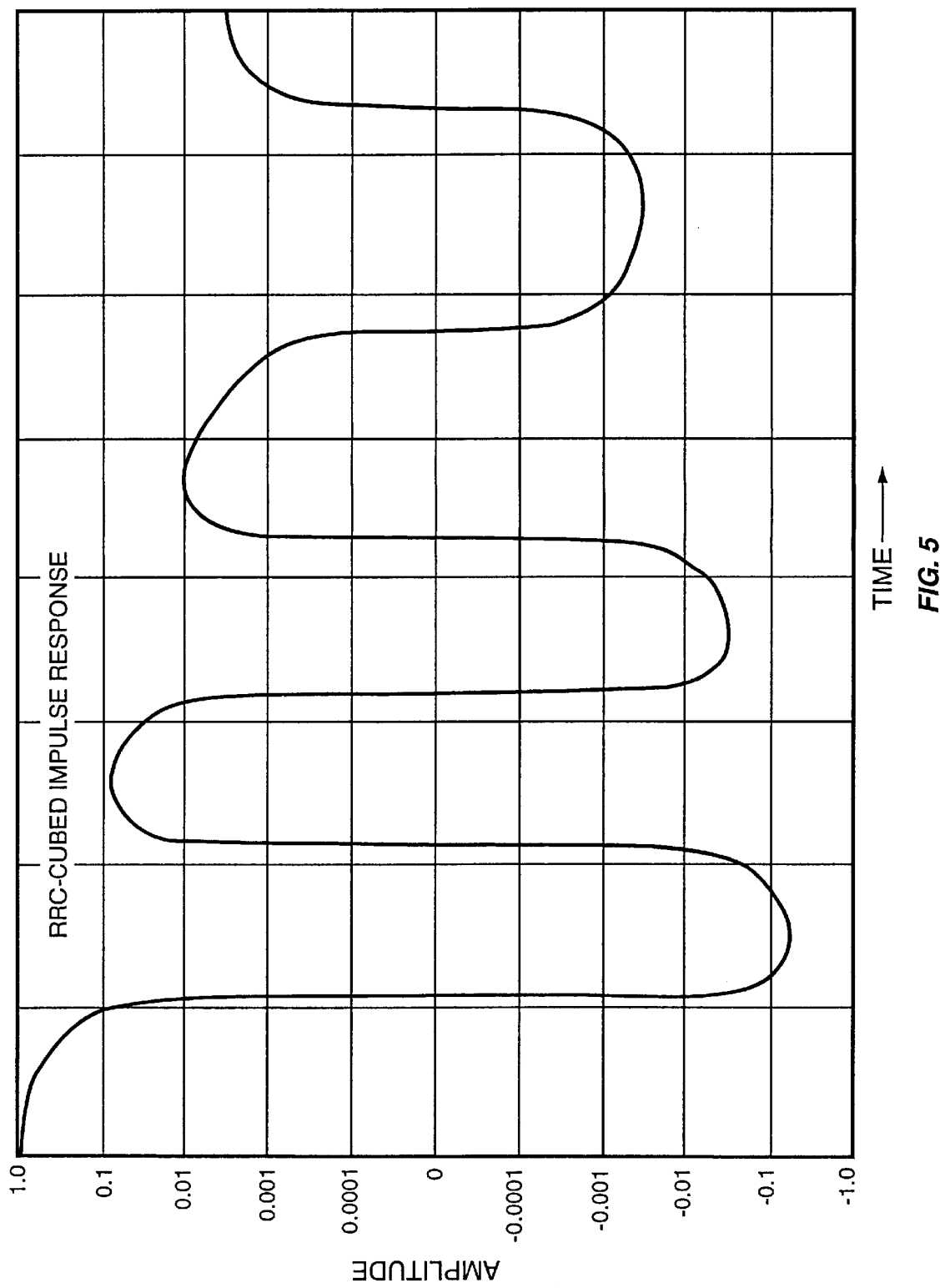
FIG. 5 shows an impulse response of a cubed root-raised cosine filter on a log scale.

With the preferred linear modulation, all of these effects are linear and may be completely described by an overall impulse response that relates received complex signal samples $z(i)$ after a receiver A/D converter to information symbols $S(k)$ at the transmitter before modulation as follows:

$$z(i)=C(-L)S(i-L)+C(1-L)S(I-L+1)+C(-1)S(i-1)+C(o)S(i)+C(1)S(i+1)+C(L-1)S(i+L-1)+C(L)S(i+L)$$

where the $2L+1$ coefficients $C(-L)$ to $C(+L)$ describe the shape of the composite impulse response. The number of coefficients that need to be used depend on the accuracy of own-signal subtraction required. For example, if it is desired to suppress own signal interference by 30 dB, it is necessary to use all coefficients of the impulse response that are greater than $-30$ dB relative to the impulse response peak. The impulse response for a raised cosine Nyquist filter is shown in FIG. 4. This illustrates that the Nyquist filter has zero crossings spaced at intervals of one symbol (each horizontal axis division is one symbol period). As an example of a response that may be modified by other factors such as transponder bandwidth restrictions. FIG. 5 shows a root-raised cosine filter cubed, i.e. there is one more RRC filter than needed to be Nyquist. It may be seen that the response is less than 0.03 ($-30$ dB) beyond about four symbol periods, therefore L need only be equal to four in the above, giving nine coefficients $C(-4)$ to $C(+4)$.

With OQPSK modulation, an information bit is modulated alternately on to the cosine part of the carrier and the sine part of the carrier. Each of the cosine and sine bits is modulated using a Nyquist filter adapted to half the bitrate. In principle, a receiver need only sample the received signal once per two bits, but it is customary to sample the signal at the bitrate, i.e., at twice the rate necessary for the I or the Q bits. That doubles the number of coefficients needed to seventeen, from $C(-8)$ to $C(+8)$.

The receiver now proceeds to evaluate the coefficients and to subtract its own interference as follows. First, the receiver reads back from memory the bits it transmitted T milliseconds ago. For example, if TDMA is used with approximately 144 bit periods per timeslot, the 144 bits would be read from memory, plus some end-effect bits (8 on each end) corresponding to the ±8 coefficients. Next, the 144 bits read from memory are then correlated with the received signal starting with a time-alignment between the locally memorized bits and the received signal sample vector of 144 samples where a peak correlation is expected. The resulting correlation yields the coefficient C(o). C(o) times the same 144 bits from memory (which are just regarded as +1 or −1) is then subtracted from the received signal vector of 144 samples to leave a residual signal with own interference partially removed. The previous steps are then repeated with time alignments changed by +1 bit period (to yield C(1)), by −1 bit period (to yield C(−1)), and so on until a sufficient number of coefficients have been used to reduce own interference to the desired level.

Various methods may be exploited drastically to reduce the effort involved in correlating the received sample vector of 144 samples with various selections of 144 bits from memory, corresponding to different alignments and therefore to different coefficients C(i) of the impulse response. For example, the technique described in U.S. Pat. No. 5,931,893, issued Aug. 3, 1999 and entitled "Efficient Correlation Over a Sliding Window", incorporated herein by reference, may be used to perform all seventeen correlations with a reduced number of arithmetic operations. Having obtained the seventeen coefficients, these are then used to remultiply seventeen corresponding 144 bit vectors, which may be written as the matrix multiplication of a 144×17 matrix of +1's and −1's with a seventeen-element column vector of coefficients. This operation may also be reduced in effort by, for example, forming all 16 possible combinations of four coefficients at a time with either a plus (+) or a minus (−) sign, exploiting the fact that eight combinations are merely the negatives of the other eight and do not therefore need to be specifically computed, and also computing the eight combinations in Grey-code order in which only one sign changes between each successive combination.

Then, the residual after subtraction of all significant parts of own signal is submitted to a decoder 28 to decode the weaker, underlying mobile station signal that has now been uncovered.

Many other more or less mathematically equivalent methods of subtracting a known interfering signal may be employed, and the network station 102 may subtract in one shot a multi-user signal that it has transmitted to several mobile stations. For example, suppose that the network station 102 numerically generates a number of signals destined to be transmitted to different mobile stations using different channel frequencies. While still in the numerical domain, the signals are digitally Frequency-division multiplexed to form a composite signal comprising an I sample stream and a Q sample stream. The I and Q sample streams are D/A converted and modulate a cosine and a sine carrier frequency signal at a band center frequency, thereby creating the multi-carrier transmission signal.

The network station 102 receives a signal frequency bandwidth containing multiple signals on different carrier frequencies from the satellite 100 including its own multi-carrier signal that has been transponded. The network station 102 can now employ the known, numerical I,Q streams after delaying them in a memory to subtract its own transponded signal in order to demodulate the underlying transmissions from the mobile station 102. For a block of received signal comprising a column vector R of complex numerical samples r(1) . . . r(n), the coefficients C(−L) to C(+L) to be used for own-interference subtraction may be estimated by solving, in a least-squares manner, the following equation:

$$X.C=R$$

where X is an N×2L+1 matrix comprising 2L+1 successive shifts of N successive I,Q values selected centered T ago, where, T is the loop propagation delay through the satellite and back to the network station, and C is a column vector of the 2L+1 coefficients. The LMS solution is well known to be $$C=(X^{\#}X)^{-1}X^{\#}R$$

where # means conjugate transpose.

Having obtained the set of coefficients C, it may be used to multiply shifts of the delayed I,Q stream to subtract from R, then obtaining a residual $$R'=R-X.C=[(I-X(X^{\#}X)-1X^{\#})]R$$

where I is the N×N identity matrix. The residual sample block R' is then demodulated to obtain the mobile stations' signals free of interference. The term in brackets multiplying the received vector R is essentially a stop-filter that attenuates the interfering signal.

The above equations are valid for subtracting a multi-user signal where the memory-delayed elements of X are complex I,Q values that were transmitted earlier and saved, or else a single user I,Q signal, or even a single user bitstream where the elements of X comprise only binary bit values of ±1 that were transmitted earlier, the latter providing that the modulation method is a linear modulation method. When using TDMA transmissions having guard times between slots when zero symbols are transmitted, the elements of X may also contain zero values as well as +1 and −1 or +j and −j. When the linear modulation method is for example QPSK or DQPSK or Pi/4 DQPSK, each element value of X is either +1,−1,+j or −j (after systematic removal of a Pi/4 rotation for Pi/4-QPSK or Pi/4-DQPSK). For an OQPSK transmission, the elements of X comprise only ±1 for certain elements and ±j for others, but all may be changed to ±1 by a pre-rotation of the received signal to remove the systematic Pi/2 rotation between successive bits.

The invention may also equally well be used with CDMA transmission methods. Code-division multiple access inherently has the ability to suppress interfering signals in the receiver that do not correlate with a wanted signal's code. However, utilizing this so-called processing gain to suppress the network station's own signal interference reduces the ability of CDMA to allow so many mobile station signals to share the same spectrum, with consequent reduction of capacity. This reduction of capacity occurs even when orthogonal CDMA is used to make the network station's signals orthogonal to the mobile stations' signals, as there are only a limited number of orthogonal codes which must then be shared 50:50 between the network station 101 and the mobile stations 102. The above capacity loss is averted when practicing the invention and subtracting the network station's own interference prior to decoding the mobile stations' signals.

For a non-linear modulation method such as a constant-envelope modulation (CPM, CPFSK etc) then the elements of X should be I,Q values after the non-linear modulation process.

Yet another mathematical formulation of own-interference subtraction uses sequential least-squares methods, such as in the Kalman Filter, to determine the amount of own, delayed signal to subtract.

Using sequential least squares, the inverse matrix $(X^{\#}X)^{-1}$ in the above equations is remembered and updated directly from one sample period to the next instead of computing it from scratch, thereby saving considerably on computation. For each successive one of the memorized I,Q or information symbols, the inverse matrix, which we denote by B, is updated using the formula $$B = B - \frac{BSS^\# B}{1 + S^\# BS} \quad (1)$$

where S is a column vector of the last 2L+1 I,Q or symbol values including the latest value. The effect of the value more than one sample block of N values ago may be subtracted using the formula:

$$B + B = \frac{BSS^\# B}{1 - S^\# BS} \quad (2)$$

where S is now a column vector of the 2L+1 oldest values, including the oldest value occurring N values prior to the latest value. When both the above formulae are applied in succession, the updated value of B always reflects the matrix inverse based on a rectangular window of the N last I,Q or symbol values. Updating of the matrix B can be employed alternatively over non-rectangular windows of samples. All such methods come under the heading of "sequential least squares" methods, and can be sequential least squares with exponential forgetting of older values, which is achieved by increasing the old B-matrix using a multiplication factor close to but greater than unity prior to updating it. Alternatively, the Kalman filter form of least squares can be used, in which the old B-matrix is increased by adding to it a constant matrix, usually a diagonal matrix, before updating it. All such methods of de-emphasizing older information, including using equation (2) above, aim to prevent the B-matrix from decreasing gradually to zero by one means or another.

The successively updated matrix may be used to successively subtract own interference from one successive new received sample at a time, so that the same operation is performed for each new received signal sample. The formula to be used is:

$$r'(i)=r(i)-x(i)BX^\# R$$

where r(i) is a specific sample in R, and x(i) is the corresponding row of X. For example, 'i' may be the middle sample or R and the center row of X.

The 2L+1 correlations $X^\# R$ between received signal vector R and delayed own-signal value streams X may also be successively updated for each new received sample by subtracting the contribution from the oldest delayed signal values multiplied by the oldest received signal sample and adding the contribution of the newest received signal sample multiplied by the most recent delayed own-signal values. The residual received sample stream r'(i) computed by this method is then submitted to a demodulator to demodulate and decode the mobile stations' signals.

An advantage of subtracting a multi-user signal in one shot is that a given block size N of multi-user I,Q values occupies a shorter time period than the same block size of single-user signal samples. Thus, if the propagation channel is changing due to relative motion between the network station 101 and the satellite 100, it will change less over the shorter block duration. If the channel changes significantly over the duration of N own-signal values due to Doppler shift changing the phase for example, then residual error after subtraction of own-signal interference would remain.

This may be minimized by first correcting for systematic Doppler shift in the transponded signal received from the satellite 100. An "open loop" method using orbital predictions may be used, or alternatively a closed loop "AFC" method may be employed, or a combination of both may be used to correct systematic phase drift.

The ability when practicing the above invention to cancel out own-signal interference notwithstanding, it can be useful to avoid transmitting signals in one or other direction when there is no information to be transmitted in a particular direction. During a two-way speech conversation, it is assumed that the periods during which both speakers are trying to talk at once represent a small fraction of the total time. Most of the time therefore, speech flows in only one direction. The other direction of transmission may be temporarily silenced so as to conserve battery power in the case of the mobile or portable station, or to conserve satellite transmission power. In the latter case, a satellite 100 with a capacity of hundreds or thousands of channels need then only dimension its transmitter power amplifiers for the mean power which will be reduced by the transmission duty factor averaged over all channels. The use of voice or traffic activity detection to interrupt transmission is known as DTX (Discontinuous Transmission), and is used in connection with the invention not as a means to reverse the traffic flow direction to provide pseudo-duplex, but as a means to save power. The invention allows full duplex to be maintained even though two signals transmit on the same frequency at the same time.

Figure 6:
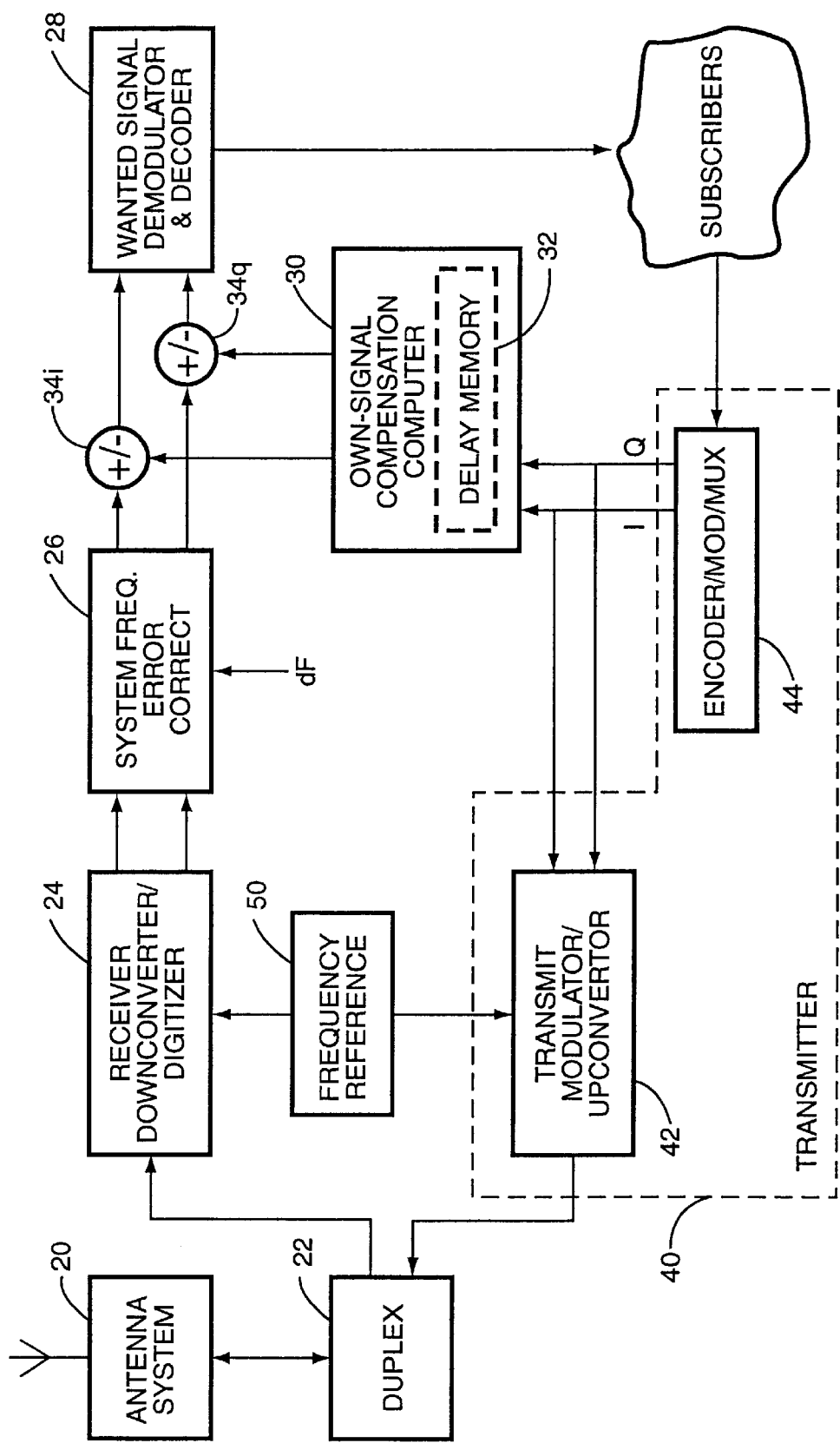
FIG. 6 is a block diagram of one embodiment of a network station according to the present invention.

FIG. 6 shows the block diagram of a network station 101 for implementing the invention. An antenna system 20 is used to transmit signals to the satellite 100 and to receive transponded signals from the satellite 100. A duplexor 22 connects the receiver 24 and the transmitter 40 simultaneously to the antenna system 20. The type of duplexor 22 depends on the type of antenna system 20 and on the access method. For example, for a two-frequency system with different up and downlink frequency bands, duplexor 22 may be a duplexing filter combination. The duplexing filters may comprise separate transmit and receive filters coupled to separate antennas or separate antenna ports of different polarization in another implementation. Alternatively, in a Time-Duplex system, which it is necessary to employ if the uplink and downlink bands are the same, the duplexor 22 may be a transmit-receive switch. A duplexing filter may also be used for time-duplex systems if it is the satellite 100 is simplified by avoiding simultaneous transmit and receive, rather than the network station 101, it being not always possible to avoid simultaneous transmit at one or the other due to delay.

The transmitter 40 comprises signal encoder, modulator and multi-plexer 44 which receives signals for transmission, for example speech signals from subscribers in the telephone network, and transmitter modulator and upconvertor 42 which modulates the transmit signal frequency f1 with the multi-user signal from multi-plexer 44. Multi-plexer 44 can for example perform digitization of analog speech signals, if not already in digital form; compression of digital speech signals using for example a RELP, VSELP or AMBE speech encoder, if not already compressed, in order to reduce the speech bitrate; voice or data activity detection for implementing DTX; error correction coding of the digital speech including the use of more error correction and error detection for the most perceptually significant compressed bits; interleaving of error-correction coded bits over several transmit time periods and grouping of bits to form modulation symbols; digital modulation waveform generation by applying symbol impulses to a root-Nyquist filter for example and shifting of different modulated waveforms to different channel frequencies by digital FDM multiplexing to obtain a composite I,Q signal representative of a frequency band containing multiple user signals. The above description of encoder/multi-plexer 44 is intended to cover any form of modulation, coding and access method. Coding appropriate to data may be used in place of coding adapted to voice if data is the type of traffic a particular subscriber is sending.

The composite I,Q signals from multi-plexer 44 are applied to modulator and upconvertor 42 to modulate, convert and amplify the modulated signals to a desired frequency and power level for transmission. The composite I,Q signals are also applied to own-signal compensation computer 30 including delay memory 32.

Receiver 24 receives signals in the downlink frequency band from antenna system 20 via duplexor 22 and downconverts the signals and digitizes the signals using a complex digitization method to obtain I,Q sample streams. The downconversion and digitization can either be of the log-polar type, such as described in U.S. Pat. No. 5,048,059, which is hereby incorporated by reference, or alternatively can be of the I,Q downconvertor or homodyne type, such as described in U.S. Pat. Nos. 5,749,051; 5,712,637; 5,614,904; 5,568,520; and 5,241,702, all of which are hereby incorporated by reference.

The transmitter upconversion and receiver downconversion are synchronized to a common frequency reference 50, so that any frequency error between the received I,Q stream and the transmitted I,Q stream is due to satellite frequency translation error or Doppler shift. If significant, this is first compensated by systematic frequency error correction unit 26 which applies a successively increasing phase rotation to the received and converted I,Q samples that is equivalent to a frequency correction dF. The correction dF can be supplied by an orbit tracking system (not shown) or else can be AFC feedback from compensation computer 30. The compensation computer 30 can estimate dF from the rate of phase rotation of the complex weighting coefficients which it uses to weight the delayed signal to obtain the compensation signal. The best estimate of dF is formed by weighting the phase derivatives for each coefficient by the square of the magnitude of each coefficient and adding, then dividing the sum by the sum of the squares of the coefficient magnitudes to obtain a mean phase derivative that is the best estimate of dF.

Compensation computer 30 delays the transmitted I,Q signals in delay memory 32 by a number of samples corresponding to the loop propagation delay through the satellite transponder. This number may also be supplied by an orbital tracking system (not shown) or may be tracked within the compensation computer 30 itself such that the peak of correlation between delayed signals and received signals is in the center of a compensation delay window. The delayed I,Q signals are then combined with received, frequency-compensated I,Q values using the mathematical operations disclosed above to obtain an I,Q compensation value that shall be subtracted from each received I,Q value in subtractors 34i and 34q to obtain I,Q values compensated for both frequency error and own-signal interference. The now interference-compensated I,Q signals are then demodulated in demodulator and decoders 28, which may include digital channelization for FDMA signals; partitioning into timeslots for TDMA signals, or correlation with spread-spectrum access codes for CDMA signals, or any combination of the above. Note that the general block diagram of FIG. 6 works for any modulation method, linear or non-linear, and for any access method and even when using different access methods or modulations on the up and down links as described in U.S. Pat. No. 5,539,730, which is hereby incorporated by reference. Multiple-signal demodulator 28 can also comprise any of the techniques described in U.S. Pat. Nos. 5,151,919; 5,218,619; 5,230,003; 5,331,666; 5,557,645; 5,577,053; 5,577,068; 5,615,231; 5,619,533; 5,646,963; 5,673,291; 5,742,908; 5,764,646; 5,790,549; 5,841,816; and 5,862,173, all of which are hereby incorporated by reference.

When for example an asymmetrical TDMA method is used in which channel spacings for communicating from mobile stations 102 to the network stations 101 are a fraction of the channel spacing used for communicating from the network stations 101 to the mobile stations 102, it is possible that several mobile-to-network channels overlap one network-to-mobile channel. Nevertheless, the network station 101, upon compensating for own interference by subtracting its wide channel-bandwidth signal, uncovers the several mobile station signals in one shot.

The demodulated and decoded signals from multiple-signal demodulator 28 are then coupled back to the subscribers with whom the mobile stations are in communication, via the PSTN or Internet for example.

The block diagram of FIG. 6 and the above description may also be applied to a mobile station 102 that needs to subtract out own interference before decoding a wanted signal. In that case, the signal to be subtracted is a single-user signal and not a multi-user signal, but the principle is the same. A mobile station 102 would hopefully not need to subtract out own-signal or other mobile interference when communicating with a network station 101 whose signal is dominant; however, the need may arise if the system permits direct mobile-to-mobile connections, the overlapping signals of two mobile stations 102 then being equally strong. In the case of an asymmetrical TDMA system, direct mobile-to-mobile communication requires either that the mobile stations 102 have the ability to adapt alternatively to the network station signal bandwidth or the mobile station signal bandwidth, or else that the repeater can convert a TDMA signal of narrow bandwidth to a TDMA signal burst of wider bandwidth by time-compression, as disclosed in U.S. Pat. No. 5,809,141, which is hereby incorporated by reference.

It is also possible for the repeater to permit using the above-described techniques independently in a large number of separate antenna beams thereby re-using the same channel frequencies many times over to increase capacity. Improved methods to re-use channel frequencies or timeslots many times over in other beams are described in U.S. Pat. Nos. 5,848,060; 5,844,894; 5,812,947; 5,642,358; 5,631,898; 5,619,503; 5,619,210; 5,594,941; 5,579,306; 5,555,257; 5,548,813; and 5,425,049, which are all hereby incorporated by reference.

The invention may also be extended to the case where the repeater re-routes a signal received from a mobile station 102 in one beam 103 and transmits it to a network station 102 using a different beam 104. Conversely, the repeater can reroute the signal received from a network station 101 using one beam and retransmit it to a mobile station 102 using another beam. In these cases, a first network station 101 receives a mobile signal superimposed on second network station's signal. The second network station's transmitted signal, or information bits, may be conveyed to the first network station 101, for example by landline, there being ample time available to do this bearing in mind the need to delay such signals in any case by the round trip delay. However, to avoid this transmission cost, the first network station 101 would wish to compensate for the second network station's interfering signal without knowledge of all of the transmitted information bits.

The technique of joint demodulation of both the wanted signal together with the unwanted signal may be employed for the above circumstance, using a Joint Maximum Likelihood Sequence estimator (JMLSE), which is a version of the Viterbi algorithm. If information about any symbols (e.g. own symbols, or other stations' known symbols such as syncwords) is available, the JMLSE machine may be simplified by reducing the number of Viterbi states processed and its performance improves. Moreover, when subtracting a single interfering signal, the delayed "own signal" used in compensation computer 30 to compute compensation I,Q values need comprise only the binary values +1 and −1, and possibly zero to represent guard periods of no transmission between TDMA bursts or during DTX. Compensation computer 30 then correlates only +1/−1/0 delayed value streams with the received signal, which is simpler than correlating arbitrary complex I,Q values.

If joint demodulation is used at one network station 101 to remove a different network station's interference, the technique of "Joint Decodulation" may be used, as described in U.S. patent application Ser. No. 08/710,537 entitled "Interference Mitigation By Joint Decoding Of Overlapping Signals", which is incorporated herein by reference.

Thus it has been described how a communications system can be constructed using a repeater to receive signals from at least a first and a second remote station and transpond the received signals to both of the at least first and second remote stations, which, by the inventive device of subtracting own-signal components from the transponded signal received by at least one of the remote stations, can permit the same frequency channel to be used simultaneously for both directions of communication, from the first station to the second station and from the second station to the first station, thereby doubling the spectral efficiency compared with the prior art and simplifying the repeater hardware. The invention may be adapted into many forms to both satellite and land-based repeaters by a person skilled in the art using the present teachings, which however are all considered to be within the scope and spirit of the invention to the extent defined by the following claims.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of communicating information signals simultaneously between a first station and a second station with the aid of an intervening repeater, comprising:
    a) transmitting a first information-modulated signal from said first station to said repeater using a first communications channel;
    b) transmitting a second information-modulated signal from said second station to said repeater using said first communications channel;
    c) receiving said first and second signals superimposed at said repeater;
    d) translating said received superimposed signals to a second communications channel and transmitting said translated superimposed signals on said second communications channel;
    e) receiving said translated superimposed signals on said second communications channel at said first station;
    f) processing, at said first station, said received signal to decode said second information-modulated signal by compensating for said superimposed first information-modulated signal transmitted by said first station.

2. The method of claim 1 wherein said compensating includes said first station retaining delayed information transmitted by itself and jointly processing the received signal together with said delayed information.

3. The method of claim 2 wherein said joint processing includes weighting said delayed information using weighting coefficients and subtracting weighted delayed information from the received signal.

4. The method of claim 3 wherein said weighting coefficients are determined by correlating the received signal with said delayed information.

5. The method of claim 2 wherein said joint processing includes using said delayed information to form a stop-filter adapted to reject said first information-modulated signal and filtering the received signal using said stop-filter to remove said first information-modulated signal.

6. The method of claim 3 wherein said weighting coefficients are determined by a method of least squares equation solving.

7. The method of claim 6 wherein said method of least squares equation solving is a sequential least squares method.

8. The method of claim 7 wherein said sequential least squares method is a Kalman filter.

9. The method of claim 7 wherein said sequential least squares method exponentially de-emphasizes older information samples.

10. The method of claim 7 wherein said sequential least squares method subtracts the influence of the oldest information sample in a rectangular time window.

11. The method of claim 3 wherein said weighting coefficients are estimates of the propagation channel from said first station's transmitter input through said repeater to said first station's receiver output.

12. The method of claim 1 wherein said compensating includes delaying, at said first station, a baseband representation of said first information-modulated signal transmitted by said first station and jointly processing the received signal together with said delayed baseband representation.

13. The method of claim 12 wherein said baseband representation is a complex number stream.

14. The method of claim 12 wherein said joint processing includes weighting said delayed baseband representation using weighting coefficients and subtracting the weighted delayed baseband representation from the received signal.

15. The method of claim 14 wherein said weighting coefficients are determined by correlating the received signal with said delayed baseband representation.

16. The method of claim 12 wherein said joint processing includes using said delayed baseband representation to form a stop-filter adapted to reject said first information-modulated signal and filtering the received signal using said stop-filter to remove said first information-modulated signal.

17. The method of claim 14 wherein said weighting coefficients are determined by a method of least squares equation solving.

18. The method of claim 17 wherein said method of least squares equation solving is a sequential least squares method.

19. The method of claim 18 wherein said sequential least squares method is a Kalman filter.

20. The method of claim 18 wherein said sequential least squares method exponentially de-emphasizes older signal samples.

21. The method of claim 18 wherein said sequential least squares method subtracts the influence of the oldest signal sample in a rectangular time window.

22. The method of claim 14 wherein said weighting coefficients are estimates of the propagation channel from said first station's transmitter output through said repeater to said first station's receiver output.

23. The method of claim 1 wherein said first information-modulated signal includes information-modulated signals intended for said second station and information-modulated signals intended for other stations.

24. The method of claim 23 wherein the first station decodes the signal received from said repeater by compensating for all of the information-modulated signals transmitted from said first station whether or not they were intended for reception by said second station.

25. The method of claim 1 wherein said first communications channel is a first radio frequency in a first frequency band and said second communications channel is a second radio frequency in a second radio frequency band.

26. The method of claim 1 wherein said first communications channel is a first timeslot on a first radio frequency and said second communications channel is a second timeslot on a second radio frequency.

27. The method of claim 1 wherein said first communications channel is a first timeslot on a first radio frequency and said second communications channel is a second timeslot on said first radio frequency and said first and second timeslots do not overlap at said repeater.

28. The method of claim 1 wherein said first and second information-modulated signals have different bandwidths.

29. A method for communicating information using a repeater with a multi-beam antenna between a first station in a first beam and a second station in a second beam, comprising
   a) transmitting a first information-modulated signal from said first station to said repeater using a first communications channel in said first beam;
   b) transmitting a second information-modulated signal from said second station to said repeater using a second communications channel in said second beam;
   c) transmitting a third information-modulated signal from a third station to said repeater using said second communications channel in said second beam;
   d) receiving said first and second and third signals at said repeater;
   e) translating said received signals in said second beam, including said second and third signals, to a third communications channel and transmitting said translated signals on said third communications channel in said first beam;
   f) receiving said translated signals on said third communications channel at said first station; and
   g) processing, at said first station, said received signal to decode said second information-modulated signal from said second station by compensating for the interfering signal transmitted by said third station.

30. The method of claim 29 further comprising transmitting from said third station to said first station a copy of said third information-modulated signal.

31. The method of claim 29 further comprising transmitting from said third station to said first station a copy of the information used to modulate said third information-modulated signal.

32. The method of claim 29 further comprising jointly demodulating said second information-modulated signal with said third information-modulated signal at said first station.

33. The method of claim 32 wherein said joint demodulation uses a Joint Maximum Likelihood Sequence Estimator.

34. The method of claim 33 wherein said third information-modulated signal includes known symbols transmitted by said third station for synchronization purposes and wherein said known symbols are exploited to reduce complexity of said joint demodulation.

35. The method of claim 29 further comprising jointly and simultaneously demodulating and decoding said second and third information-modulated signals.

36. A method of communicating information signals simultaneously between a first station and a second station with the aid of an intervening repeater, comprising:
   a) at a first station,
      i) modulating a first information signal based on a first set of data;
      ii) transmitting said first information signal to said repeater using a first communications channel;
      iii) temporarily buffering said first information signal at said first station;
   b) transmitting a second information signal from said second station to said repeater using said first communications channel;
   c) receiving a combined signal at said repeater on said first communications channel representing said first and second information signals superimposed together;
   d) translating said combined signal to a second communications channel and transmitting said translated combined signal on said second communications channel;
   e) receiving said translated combined signal on said second communications channel at said first station;
   f) processing, at said first station, said received signal to decode said second information signal by subtracting said first information signal transmitted by said first station from said received signal.

37. The method of claim 36 wherein said buffering terminates no later than immediately after said second information signal is decoded from said received signal.

38. The method of claim 36 wherein said processing of said received signal includes subtracting a weighted version of said first information signal from the received signal.

39. The method of claim 38 wherein said weighted version depends on a plurality of weighting coefficients and wherein said weighting coefficients are determined by correlating the received signal with said buffered representation.

* * * * *